United States Patent [19]

Beck

[11] Patent Number: 4,603,622
[45] Date of Patent: Aug. 5, 1986

[54] FAT FRIER

[76] Inventor: Reinhold Beck, Bornweg 8, 6296 Mengerskirchen, Fed. Rep. of Germany

[21] Appl. No.: 688,914

[22] Filed: Jan. 4, 1985

[30] Foreign Application Priority Data

Jan. 5, 1984 [DE] Fed. Rep. of Germany ....... 3400241
Sep. 1, 1984 [DE] Fed. Rep. of Germany ....... 3432246

[51] Int. Cl.⁴ .............................................. A47J 37/12
[52] U.S. Cl. ........................................ 99/331; 99/403; 99/408; 126/391; 219/441; 210/540; 210/DIG. 8
[58] Field of Search .......................... 99/403, 408, 331; 126/391; 219/441; 210/DIG. 8, 534, 540

[56] References Cited

U.S. PATENT DOCUMENTS 782,065 2/1905 Shaler .............................. 210/540 X
2,756,321 7/1956 Pappas .............................. 126/391 X

FOREIGN PATENT DOCUMENTS 558163 1/1975 Switzerland .......................... 99/403

Primary Examiner—Billy J. Wilhite
Attorney, Agent, or Firm—Howard M. Ellis; Michael L. Dunn

[57] ABSTRACT

A fat frier comprising a fat container which contains fat to be heated and in which are disposed a heating means, a sieve-type or mesh-type container for the material to be fried and, beneath the fat to be heated, a layer of water, characterized in that disposed in the fat container, beneath the heating means, are cooling means which cool the fat in the region of the interface between the fat and the water.

18 Claims, 3 Drawing Figures

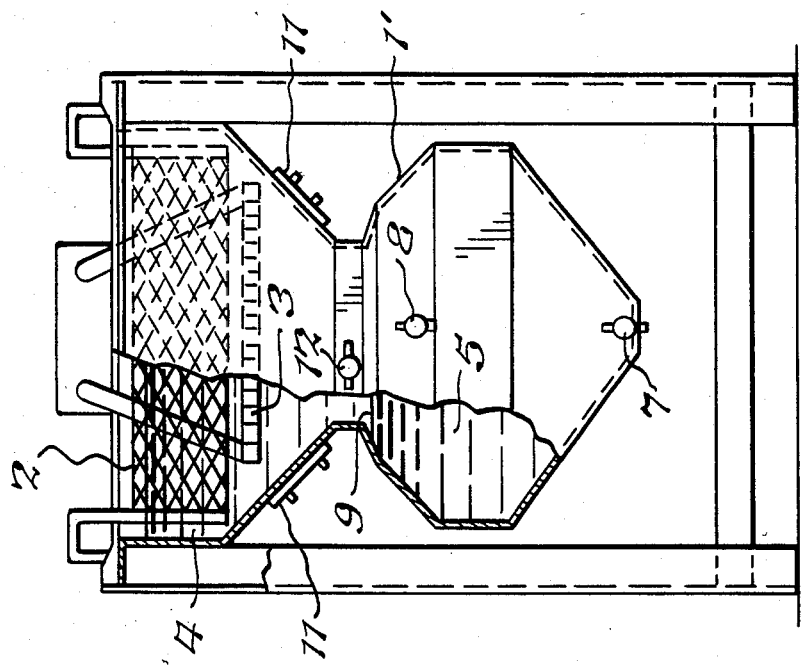
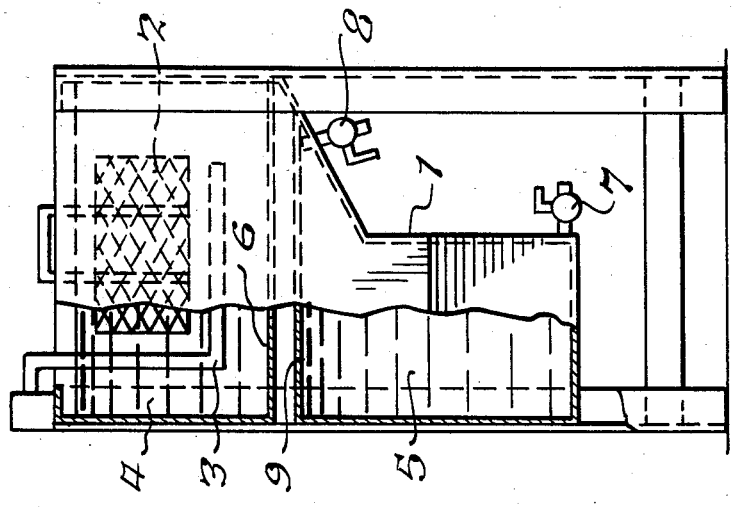
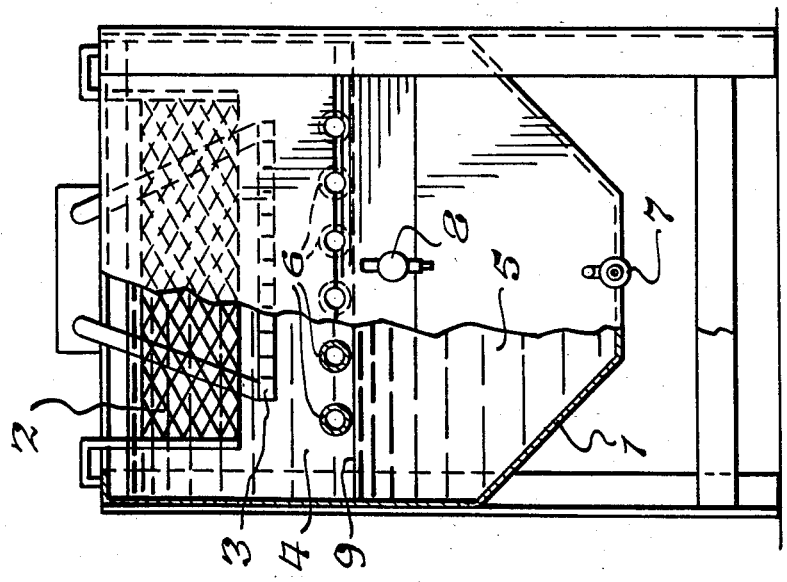

FAT FRIER

Fat friers which are used for frying various foods suh as French fries, fried potatoes, fish, doughnuts, or meat cutlets or schnitzels have a fat container which contains fat to be heated and in which are disposed a heating means and a mesh or sieve-type container for the foods to be fried. The heating means can generally be pivoted out of the fat container and is so arranged that the heating element is disposd in the layer of fat beneath the mesh or sieve-type container.

In known fat friers of that kind, some of which are also referred to as deep fat friers, small pieces of material being fried, that is to say, the foods to be fried and condiments or seasoning usually drop off during the frying process and circulate in the hot fat as, because of the convection currents in the hot fat, they cannot settle at the bottom of the fat container. During such circulatory motion, th small pieces of fried material burn and cause the fat very quickly to become dirty. Fat which is contaminated in that way is responsible for the undesired transfer of substances with an unpleasant taste and smell onto fresh material to be fried, the quality of taste of which is adversely affected in that way. Consequently, in the known fat friers, it is necessary for the fat to be frequently replaced when the frier is used all day.

German published specification (DE-AS) No 11 10 834 discloses a frier which has a layer of water below the oil to be heated. There are no cooling means in that frier. The frier can only be operated with oil, but nowadays oil is virtually no longer used for that purpose as it is substantially less stable than all fats, because of its structure. It has about 50% more unsaturated fatty acids which very quickly char when subjected to the the effects of heat, which is uneconomical. If fat which solid at room temperature were used in that frier, the distance between the heating means and the interfacee between the fat and the water would have to be maintained at a relatively large value in order to prevent the water from evaporating into the the layer of fat. That would undesirably increase the amount of fat required and would make it more expensive to operate the frier.

The basic object of the present invention was accordingly so to improve fat friers which can be operated with fats which are solid at normal temperature, that the amount of fat required is reducd and/or the useful life of the fat is enhanced and the frequency of replacement of the fat is reduced, while the reduction in quality of the fried material due to the transfer of undesired substances with an unpleasant taste is prevented or at least reduced.

To achieve that object, the fat frier according to the invention, comprising a fat container which contains fat to be heated and in which are disposed a heating means, a mesh-type or sieve-type container for the substance to be fried and a layer of water beneath the fat to be heated, is characterized in that disposed in the fat container, beneath the heating means, are cooling means which cool the fat in the region of its interface with the layer of water.

By virtue of the provision of the cooling means which cools, in the fat, the region of the interface between the water and the fat, there is surprisingly no evaporation of the layer of water which is underneath the layer of fat and the region of the fat which directly adjoins the interface does not participate in the convection movement in the hot fat so that region remains sufficiently cool and the particles of fried material which have dropped off and which go into that region are not entrained upwardly again. On the contrary, those particles sink down through the interface between the fat and the water into the layer of water and are deposited therein as a settlement layer, without circulating and being burnt in the fat.

The result of that is that the fat remains clean for much longer and does not transfer any charred or uncharred taste-imparting substances, onto the substance to be fried. In that way, the fat can be kept in a usable condition for four to five times as long as in the case of the known friers, and the fat has to be changed much more infrequently. That gives a substantial saving in fat as well as a saving in work which is involved in the change of fat and the cleaning of the fat container.

An additional surprising advantage of the fat frier according to the invention is that, when fresh water-bearing material to be fried, such as food from deep freezers, is put in, the known phenomena of the fat foaming over are eliminated or greatly reduced, the cause of which cannot be readily explained.

In deep friers according to the invention, the thermostatic control which is usually incorporated in fat friers operates more accurately than in the case of the known fat friers, because of the improved circulation of fat. In addition, with the fat friers according to the invention, there is no need for the heating means to be made in such a way that it can be pivoted out of the container, which saves the costs of the expensive pivoting system and eliminates the danger to the power cable and the capillary tube of the heat sensor of such pivoting systems.

Finally, the cool region also eliminates local overheating in the fat, which is a further advantage of the subject of this invention.

The invention makes use of the fact that fat and oils float on water so that there is a natural interface between the lower cushion or layer of water and the layer of fat thereabove. If an oil or a fat which remains liquid at room temperature is used in the upper layer, which is obviously also possible, that arrangement is unrestrained and unhampered in regard to the cooling means and the cooling temperature as the particles of fried material are able in any case to pass through the interface between the liquid fat and the water and can sink into the layer of water. If however, as is usual and particularly desirable, the fat used for frying is one which sets at rooming temperature, the cooling action of the cooling region can only be to such an extent that the fat still remains liquid in that region so that the downwardly moving particles of fried material can pass therethrough. Preferably, the temperature in the fat is maintained in the direct vicinity of the interface between the fat and the water, at a value of from 30° to 60° C., in particular from 40° to 50° C., while in the frying region, that is to say, in the region of the sieve-type or mesh-type container, the temperature of the fat is usually about 170° to 190° C., in particular 80° C.

The cooling means may be of varying configurations.

An advantageous cooling means comprises a reduction in the cross section of the fat container, such as a constriction of the fat container in the region of the interface between the fat and the water or somewhat thereabove. In that constricted region, the amount of fat to be cooled or the contact area as between the fat and the water is relatively small so that it can easily cooled from the exterior by the circulating air. In addition, the circulation of fat in the reduced region is sluggish so that the water is usually not heated to above 50° C.

That construction is particularly suitable for small friers. In the case of larger friers, a combination of such a constriction with cooling pipes is to be preferred.

The cooling means may also be a cooling coil through which flows a cooling fluid such as water, or another conventional cooling more. However, particularly simple and appropriate are cooling means with comprise substantially horizontal pipes which are open at both ends and through which passes air. Therefore, such pipes pass through the wall of the fat container, with their ends, and open outwardly at two oppositely disposed sides of the fat frier. Such cooling means are of a very simple construction, do not require any maintenance, do not require any energy for passing coolants therethrough, and hold the fat in the bounday layer between the fat and the water at the desired temperature in the above-indicated region, without the danger of the fat being excessively cooled and thus solidifying at the interface between the fat and water.

In accordance with an advantageous embodiment of the invention, disposed above and adjacent the fat-water interface is an additional heating means in order to prevent a solid layer of fat remaining for a prolonged period of time in the region of the fat-water interface when the frier is heated up or temporarily switched off and then set in operation again. A solid layer of fat of that kind would impair the advantageous operation of the apparatus and prevent the particles of fried material from sinking into the layer of water.

The additional heating means is preferably controlled by a thermostat in dependence on the temperature in the fat near the interface. Preferably, the heating means holds the fat in that region at a temperature of from 40° to 50° C., in particular at about 50° C. The additional heating means switches off when that temperature is reached. It may comprise heating coil or heating means disposed on the outside wall of the fat container.

Another avantageous embodiment of the appliance according to the invention is provided with a thermostat in the fat near the interface, the thermostat switching off the main heating means when a given temperature is exceeded. The switch-off temperature is usually about 70° C. That avoids overheating and boiling of the water.

The fat container advantageously has a bottom which tapers downwardly so that the settlement layer of the particles of fried material which have sunk accumulates at the tip of the tapered configuration and therefore can be more easily removed from there, when the fat and the water are changed.

In theory, after the change of fat, it is possible for the contamination material to be scooped out of the layer of water which is then accessible. It is preferable however to provide a respective discharge, in particular a drain cock, in per se known manner, for the change of fat and also for the change of water; the discharge or the drain cock for draining the water is disposed at the lowest point of the fat container while that for draining the fat is arranged directly at the fat-water interface.

After the fat and the water with the contamination material therein have been discharged and the frier has been cleaned, after the water drain cock has been closed, fresh water is first poured in until it reaches the fat discharge and issues therefrom. The fat discharge or drain cock is then closed and the required amount of fat is introduced on top of the layer of water.

With the subject of this invention, evaporation of water from the lower layer of water was not noted when the fat at the fat-water interface was cooled to 40° to 50° C. as in that case the layer of water therebelow is substantially at room temperature.

In the drawings:

FIG. 1 is a diagrammatic view from the front in vertical section through an embodiment of a fat frier according to the invention, FIG. 2 is a view in vertical section, from the side, of the fat frier shown in FIG. 1, and FIG. 3 shows a view corresponding to that shown in FIG. 1 of a further embodiment of a fat frier according to the invention.

The fat frier or deep fat frier shown in FIGS. 1 and 2 has a fat container 1 with a layer of water 5 in the lower part thereof and a layer of fat 4 in the upper part thereof. The interface between the two layers 4 and 5 is denoted by reference numeral 9.

Disposed in the layer of fat 4 is the heating means 3 and above same is the mesh-type or sieve-type container 2 for the material to be fried.

Disposed directly above the interface 9 between the layer of fat 4 and the layer of water 5 are cooling means 6 in the form of pipes which are disposed in parallel relationship to each other. The ends of the pipes extend through the wall of the fat container 1 and open outwardly so that air can flow therethrough.

Disposed directly below the interface 9 is a drain cock 8 for the fat while disposed in the conically tapering lower end of the fat container 1, at the lowermost end portion thereof, is a drain cock 7 for water and contamination slurry. The water level or interface between the layer of fat 4 and the layer of water 5 can be determined by the upper end of the fat drain cock 8, in that, when the fat container 1 is filled, so much water is introduced until it issues from the open fat drain cock 8.

In the embodiment illustrated in FIG. 3, the same reference numerals are used to denote the same components as in FIGS. 1 and 2 except the fat container has been labeled 1'.

Once again, the fat frier has a layer of fat 4 in its upper part and a layer of water 5 in its lower part, the layers 4 and 5 meeting each other at the interface 9. The interface 9 is in the region of the constriction 10 of the fat container. The constriction in turn is beneath the heating means 3 and the container 2. The drain cock 7 is provided for draining off water while the drain cock 8 is provided for draining off fat.

Disposed on the outside of the fat container a little below the interface 9, on the outside wall thereof, is an additional heating means 11 which is controlled by a thermost 12. The thermostat 12 switches off the heating means 3 when a given temperature, for example 70° C., is exceeded, in order to prevent overheating the water.

The inclination or sloping wall portion in the lower region of the fat container is so steep that settlement material is not deposited there but sinks into the water bath. That construction also affords improved cleanability in respet to the lower water container as there are no cooling pipes in the way in that part. The fat-water contact region is about 3 to 6 centimeters high, in order to regulate the fat-water level. In appliances which are subjected to a severe loading, the water level is lowered in the contact region while appliances which are used to a lesser degree may have a higher water level.

In order to show the technical effect of the appliance according to the invention, with a fat frier in accordance with the state of the art, a fat frier of the design shown in FIGS. 1 and 2 was compared with a corresponding fat frier in accordance with the state of the art, having the same volume of fat but without a layer of water and without cooling means.

With the same operating conditions, that is to say, the same amount of fat and the same fat temperature as well as the same material to be fried, in the form of French fries made from new potatoes, the AV-acid index (as indication in respect of the fatty acid content) and the oxidation index were used as criteria in regard to the need for replacement of the fat as a result of the qualities of the fat being impaired.

With the fresh unused fat employed in the appliance, the above-monitored acid index was 0.07 and the oxidation index was 0.49 mg/kg.

With the fat fries according to the state of the art, the acid index was 1.85 and the oxidation index was 1.30 mg/kg, after 65 hours of operation.

In contrast, when using the fat frier according to the invention, after 310 hours of operation, the acid index was 0.44 and the oxidation index was 1.12 mg/kg.

It will be seen therefore that, in spite of being in operation for a period of time which is about five times longer, when using the frier according to the invention, the degree of decomposition and contamination of the fat used considerably lower than when using the fat frier according to the state of the art under the same operating conditions.

I claim:

1. A fat frier comprising a fat container having an upper zone and a lower zone, said upper zone holding a layer of fat, said lower zone holding a layer of water, the fat and water layers contacting one another to form a fat-water interface, said upper zone including porous container means for holding the material to be fried, and means for heating the fat to frying temperature, means for cooling the heater fat in the region of the fat-water interface to a temperature such that the fat in said region remains fluid, said frier including means for draining the fat layer disposed directly beneath the fat-water interface, and means for draining the water layer disposed at the lowest point of the lower zone of the fat container.

2. A fat frier according to claim 1 characterised in that the cooling means comprises a reduction in the cross-section of the fat container in the region of the fat-water interface.

3. A fat frier according to claim 2 characterised in that the cooling means is a constriction in the fat container in the region of the fat-water interface.

4. A fat frier according to claim 2 characterised in that the lower zone of the fat container has a downwardly tapering bottom.

5. A fat frier according to claim 2 including additional heating means disposed above and adjacent to the fat-water interface.

6. A fat frier according to claim 5 including a thermostat for controlling the additional heating means, said thermostat sensing the temperature of the fat adjacent to the interface, and preferably holds the temperature of the fat adjacent the interface at about 40° to 50° C.

7. A fat frier according to claim 2 including a thermostat adapted for switching off the heating means when the temperature of the fat in the region of the fat-water interface exceeds a given temperature, preferably about 70° C.

8. A fat frier according to claim 1 characterised in that the cooling means is substantially horizontal pipes which are open at both ends and through which flows air.

9. A fat frier according to claim 8 characterised in that the lower zone of the fat container has a downwardly tapering bottom.

10. A fat frier according to claim 9 including additional heating means disposed above and adjacent to the fat-water interface.

11. A fat frier according to claim 10 including a thermostat for controlling the additional heating means, said thermostat sensing the temperature of the fat adjacent to the interface, and preferably holds the temperature of the fat adjacent the interface at about 40° to 50° C.

12. A fat frier according to claim 11 including a thermostat adapted for switching off the heating means when the temperature of the fat in the region of the fat-water interface exceeds a given temperature, preferably about 70° C.

13. A fat frier according to claim 8 including additional heating means disposed above and adjacent to the fat-water interface.

14. A fat frier according to claim 8 including a thermostat adapted for switching off the heating means when the temperature of the fat in the region of the fat-water interface exceeds a given temperature, preferably about 70° C.

15. A fat frier according to claim 1 characterised in that the lower zone of the fat container has a downwardly tapering bottom.

16. A fat frier according to claim 1 including additional heating means disposed above and adjacent to the fat-water interface.

17. A fat frier according to claim 16 including a thermostat for controlling the additional heating means, said thermostat sensing the temperature of the fat adjacent to the interface, and preferably holds the temperature of the fat adjacent the interface at about 40° to 50° C.

18. A fat frier according to claim 1 including a thermostat adapted for switching off the heating means when the temperature of the fat in the region of the fat-water interface exceeds a given temperature, preferably about 70° C.

* * * * *